United States Patent
Wilson et al.

(10) Patent No.: US 10,370,996 B2
(45) Date of Patent: Aug. 6, 2019

(54) FLOATING, NON-CONTACT SEAL WITH OFFSET BUILD CLEARANCE FOR LOAD IMBALANCE

(71) Applicant: United Technologies Corporation, Farmington, CT (US)

(72) Inventors: Ross Wilson, South Glastonbury, CT (US); Conway Chuong, Manchester, CT (US); Dwayne K. Mecklenburg, Stafford Springs, CT (US)

(73) Assignee: United Technologies Corporation, Farmington, CT (US)

( * ) Notice: Subject to any disclaimer, the term of this patent is extended or adjusted under 35 U.S.C. 154(b) by 372 days.

(21) Appl. No.: 15/244,276

(22) Filed: Aug. 23, 2016

(65) Prior Publication Data

US 2018/0058237 A1 Mar. 1, 2018

(51) Int. Cl.
| | | |
|---|---|---|
| *F01D 11/02* | (2006.01) | |
| *F01D 25/24* | (2006.01) | |
| *F01D 5/02* | (2006.01) | |
| *F04D 29/08* | (2006.01) | |
| *F04D 29/10* | (2006.01) | |
| *F04D 29/32* | (2006.01) | |
| *F04D 29/52* | (2006.01) | |
| *F16J 15/44* | (2006.01) | |

(52) U.S. Cl.
CPC .............. *F01D 11/025* (2013.01); *F01D 5/02* (2013.01); *F01D 25/24* (2013.01); *F04D 29/083* (2013.01); *F04D 29/102* (2013.01); *F04D 29/321* (2013.01); *F04D 29/522* (2013.01); *F16J 15/442* (2013.01); *F16J 15/445* (2013.01); *F05D 2220/32* (2013.01); *F05D 2240/60* (2013.01)

(58) Field of Classification Search
CPC .......... F01D 5/02; F01D 11/025; F01D 25/24; F04D 29/083; F04D 29/102; F04D 29/321; F04D 29/522; F16J 15/442; F16J 15/445; F05D 2220/32; F05D 2240/60
See application file for complete search history.

(56) References Cited

U.S. PATENT DOCUMENTS

| | | | |
|---|---|---|---|
| 3,144,710 A | 8/1964 | Hollander | |
| 3,514,112 A | 5/1970 | Pettengill | |
| 3,594,010 A * | 7/1971 | Warth | ................... F01D 11/025 277/413 |
| 4,363,599 A | 12/1982 | Cline | |

(Continued)

OTHER PUBLICATIONS

EP search report for EP17176490.5 dated Jan. 12, 2018.

(Continued)

*Primary Examiner* — Igor Kershteyn
(74) *Attorney, Agent, or Firm* — O'Shea Getz P.C.

(57) ABSTRACT

Aspects of the disclosure are directed to an engine comprising: a first structure, a second structure configured to rotate relative to the first structure, and a floating, non-contact seal that interfaces the first structure and the second structure, where the seal includes: a shoe, a first beam coupled to the shoe, and a second beam coupled to the shoe, where during a non-operational state of the engine a reference point of the shoe is substantially centered within a range of radial deflections of the reference point of the shoe over the operating range of the engine.

10 Claims, 5 Drawing Sheets

(56) References Cited

U.S. PATENT DOCUMENTS

| | | | |
|---|---|---|---|
| 4,676,715 A * | 6/1987 | Imbault | F01D 25/246 |
| | | | 415/116 |
| 4,872,812 A | 10/1989 | Hendley | |
| 5,127,793 A | 7/1992 | Walker | |
| 6,254,344 B1 | 7/2001 | Wright | |
| 6,311,983 B1 * | 11/2001 | Burcham | F16J 15/002 |
| | | | 277/370 |
| 7,182,345 B2 * | 2/2007 | Justak | F01D 11/00 |
| | | | 277/355 |
| 7,410,173 B2 * | 8/2008 | Justak | F01D 11/00 |
| | | | 277/355 |
| 7,896,352 B2 | 3/2011 | Justak | |
| 8,002,285 B2 | 8/2011 | Justak | |
| 8,126,628 B2 | 2/2012 | Hershey | |
| 8,172,232 B2 | 5/2012 | Justak | |
| 8,505,411 B2 | 8/2013 | Justak | |
| 8,641,045 B2 | 2/2014 | Justak | |
| 8,919,781 B2 | 12/2014 | Justak | |
| 9,016,692 B2 | 4/2015 | Haubold | |
| 2012/0308368 A1 * | 12/2012 | Helvaci | F01D 11/00 |
| | | | 415/175 |
| 2015/0192028 A1 | 7/2015 | Gieg | |
| 2016/0003085 A1 | 1/2016 | Roberge | |
| 2016/0102570 A1 | 4/2016 | Wilson et al. | |
| 2016/0130963 A1 | 5/2016 | Wilson et al. | |

OTHER PUBLICATIONS

L.P. Ludwig, "Sealing Technology for Aircraft Gas Turbine Engines", NASA Technical Memorandum X-71607, Presentation Paper for Tenth Propulsion Conference, San Diego, California, Oct. 21-24, 1974.

* cited by examiner

FLOATING, NON-CONTACT SEAL WITH OFFSET BUILD CLEARANCE FOR LOAD IMBALANCE

STATEMENT REGARDING FEDERALLY SPONSORED RESEARCH OR DEVELOPMENT

This invention was made with government support under contract number FA8650-09-D-2923-0021 awarded by the United States Air Force. The government has certain rights in the invention.

BACKGROUND

Seals are used in aircraft engines to isolate a fluid from one or more areas/regions of the engine. For example, seals control various parameters (e.g., temperature, pressure) within the areas/regions of the engine and ensure proper/efficient engine operation and stability.

Referring to FIGS. 2A-2B, a prior art sealing system 200 is shown. The system 200 is used to provide an interface between a static engine structure 206 and a rotating engine structure 212. The system 200 includes a floating, non-contact seal 218 that is formed from beams 230a and 230b and a shoe 236 coupled to the beams 230a and 230b. The seal 218 may interface to the structure 206 via a carrier 242. A spacer 248 may separate the carrier 242 and/or the beams 230a and 230b from a seal cover 254. Secondary seals 260 may be included in a cavity formed between the spacer 248, the cover 254 and the shoe 236. The spacer 248 and/or the seal cover 254 may help to maintain an (axial) position of the secondary seals 260. The shoe 236 may interface to (e.g., may slide or rotate with respect to) a scalloped plate 266. The seal 218 may include at least some characteristics that are common with a HALO® seal provided by, e.g., Advanced Technologies Group, Inc. of Stuart, Fla.

In operation, air flows from a high pressure area/region 270 of the engine to a low pressure area/region 280 of the engine as shown via the arrow 284. As the air flows passes teeth 238 of the shoe 236 (where the teeth 238 are frequently formed as thin knife-edges), an associated pressure field changes. This change induces the shoe 236 to move in, e.g., the radial reference direction until an equilibrium condition is obtained. In this respect, the seal 218 is adaptive to changing parameters and allows for maintenance of clearances between the structures 206 and 212 within a relatively tight range in order to promote engine performance/efficiency. The secondary seals 260 may promote the flow 284 from the high pressure region 270 to the low pressure region 280 as shown between the shoe 236 (e.g., teeth 238) and the rotating structure 212.

As shown in FIG. 2B, the shoe 236 may be manufactured to include hooks 236a and 236b that may selectively mate with T-stops 288a and 288b, respectively, formed in an outer ring structure 288. For example, when the shoe 236 deflects radially outboard/outward, the hook 236b may contact the radially inner end of the T-stop 288b to stop further outward movement of the shoe 236. Similarly, when the shoe 236 deflects radially inboard/inward, the hook 236a may contact the radially outer end of the T-stop 288a to stop further inward movement of the shoe 236.

Referring to FIG. 2C, a cold build gap 292 may be defined between the radial inner end of the shoe 236 (e.g., the teeth 238) and a radial outer end of the structure 212. The cold build gap 292 may be used to account for build/component tolerances and may help to avoid contact between the shoe 236/teeth 238 and the structure 212 during assembly.

The reference character 294 reflects the potential distance that the shoe 236 may move/deflect radially outward during engine operation relative to the cold/non-operational state of the engine. Similarly, the reference character 296 reflects the potential distance that the shoe 236 may move/deflect radially inward during engine operation relative to the cold/non-operational state of the engine. The range of potential positions of the shoe 236, in conjunction with reference characters 294 and 296, is reflected as existing between the phantom/dashed lines 294a and 296a. While the range between the lines 294a and 296a is shown as being substantially uniform over the axial length of the shoe 236, one skilled in the art would appreciate that different portions of the shoe 236 in, e.g., the axial direction may deflect/move in different amounts. For purposes of this disclosure, such differences may largely be ignored as the movement may be analyzed/assessed relative to a reference point taken on the shoe 236.

As shown in FIG. 2C, relative to the cold/non-operational state of the engine, the potential outward deflection 294a may be greater than the potential inward deflection 296a (in terms of magnitude of deflection). In some embodiments, the opposite scenario may be true, e.g., the potential inward deflection may be greater than the potential outward deflection. Irrespective, to the extent that there is an imbalance between the outward and inward deflections that may be experienced by the shoe 236, this imbalance may result in a non-zero mean stress value imposed on the seal 218 (e.g., the beams 230a and 230b). This non-zero mean stress value may cause/increase material fatigue, thereby reducing the lifetime of the seal 218.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to an engine comprising: a first structure, a second structure configured to rotate relative to the first structure, and a floating, non-contact seal that interfaces the first structure and the second structure, where the seal includes: a shoe, a first beam coupled to the shoe, and a second beam coupled to the shoe, where during a non-operational state of the engine a reference point of the shoe is substantially centered within a range of radial deflections of the reference point of the shoe over the operating range of the engine. In some embodiments, the first structure is an engine case. In some embodiments, the second structure includes at least one of a shaft or a rotor disk. In some embodiments, the first and second structures are part of a compressor section of the engine. In some embodiments, the first and second structures are part of a turbine section of the engine. In some embodiments, the seal interfaces a first region of the engine to a second region of the engine in terms of an airflow from the first region of the engine to the second region of the engine. In some embodiments, the shoe comprises a plurality of teeth, and the airflow substantially flows in an axial direction relative to a centerline of the engine, radially between the teeth and the second structure. In some embodiments, the teeth are located radially outward of the second structure with respect to an axial centerline of the engine. In some embodiments, during the non-operational state of the engine the shoe is offset from a center of the range of radial deflections of the shoe over the operating range of the engine, where the offset is less than 30% relative to the range. In some embodiments, the offset is less than 10% relative to the range. In some embodiments, the substantial centering of the reference point of the shoe is based on a radial gap defined between teeth of the shoe and the second structure during the non-operational state of the engine.

BRIEF DESCRIPTION OF THE DRAWINGS

The present disclosure is illustrated by way of example and not limited in the accompanying figures in which like reference numerals indicate similar elements. The drawing figures are not necessarily drawn to scale unless specifically indicated otherwise.

DETAILED DESCRIPTION

Figure 1:
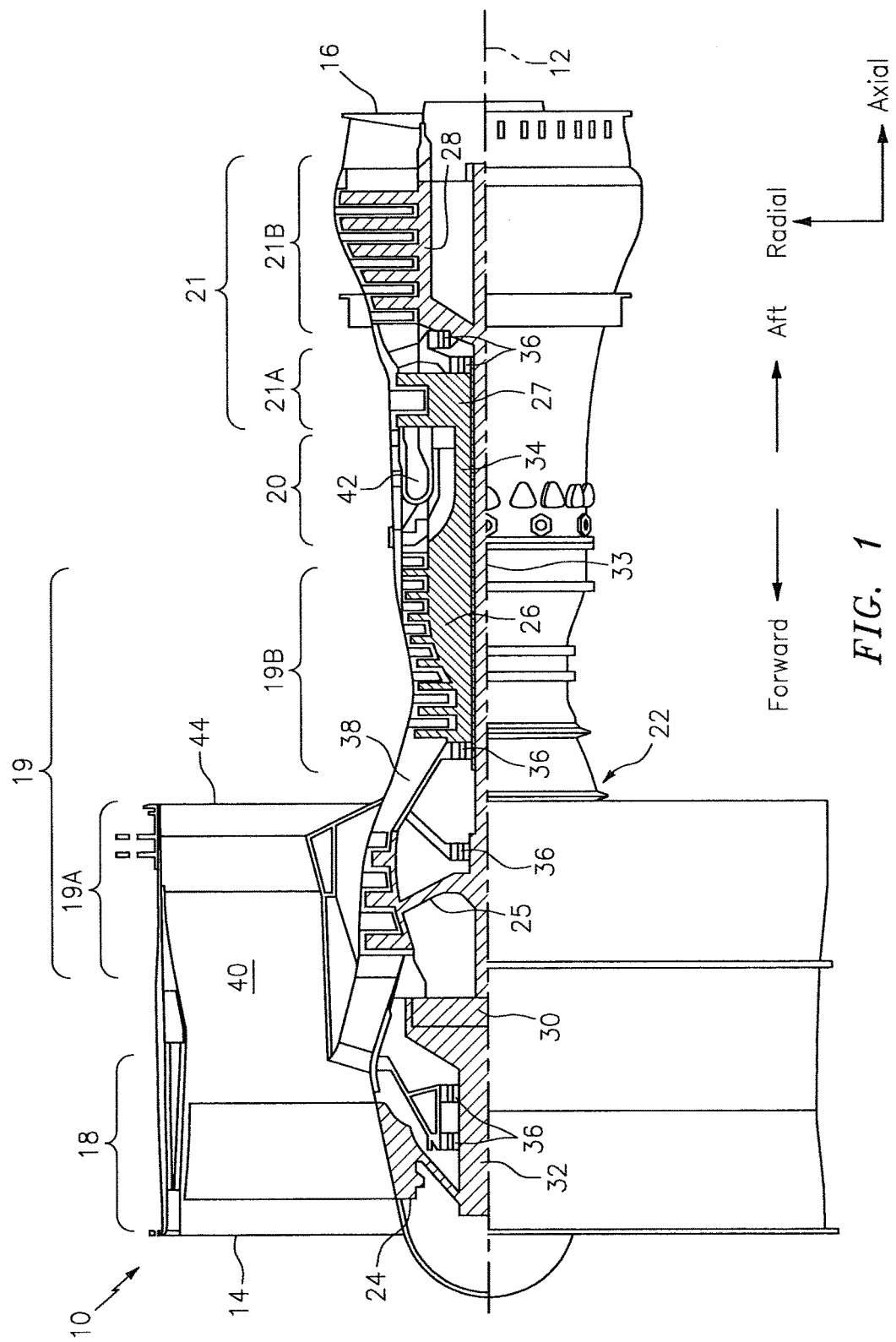
FIG. 1 is a side cutaway illustration of a geared turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

In accordance with various aspects of the disclosure, apparatuses, systems, and methods are described for balancing a seal. In accordance with this disclosure, a four-bar linkage associated with the seal may be provided, where beams of the seal are angled (e.g., non-parallel) relative to a shoe of the seal.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. Aspects of the disclosure may be applied in connection with non-geared engines.

Figure 2A:
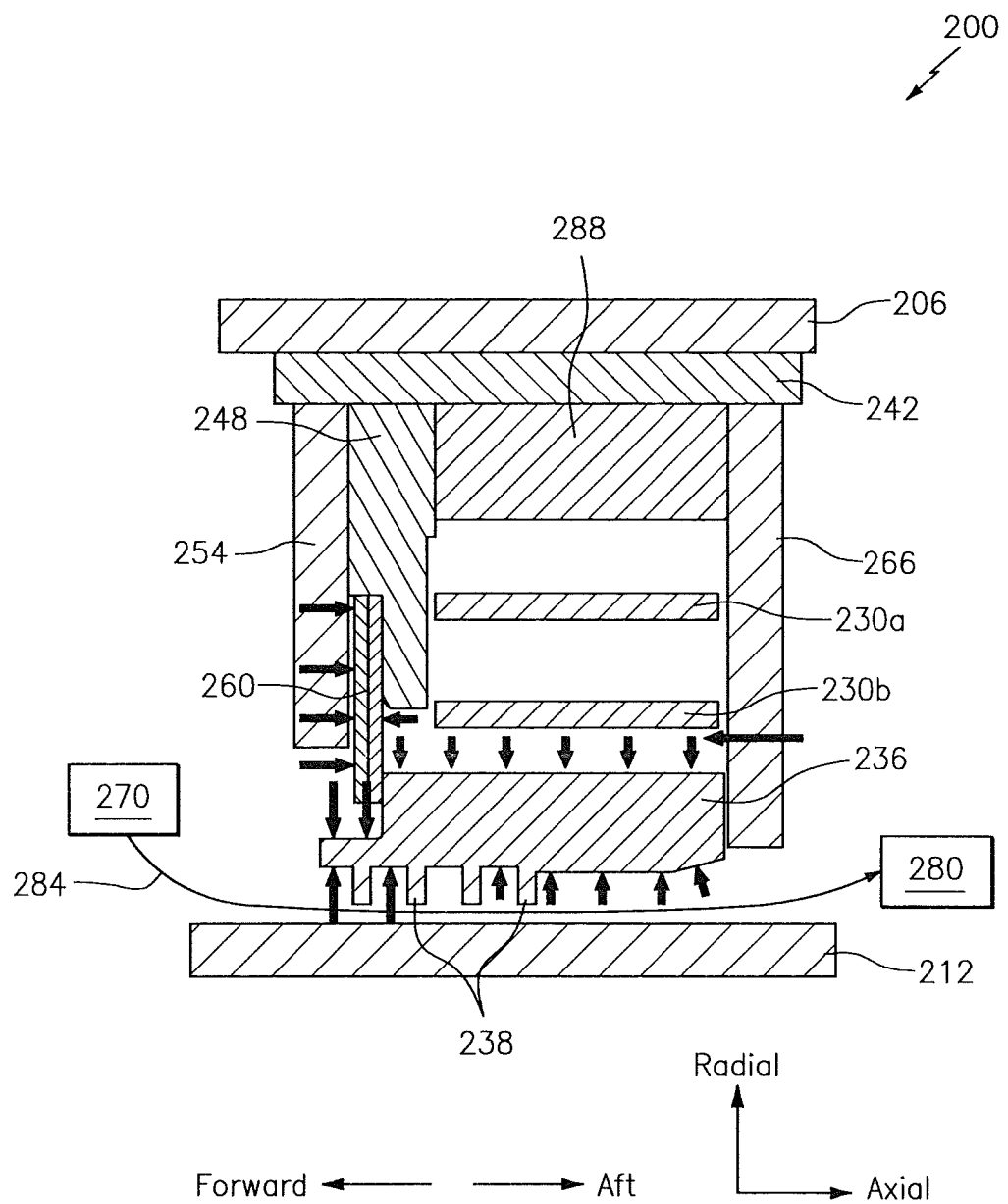
FIG. 2A illustrates a prior art sealing system.
Figure 2B:
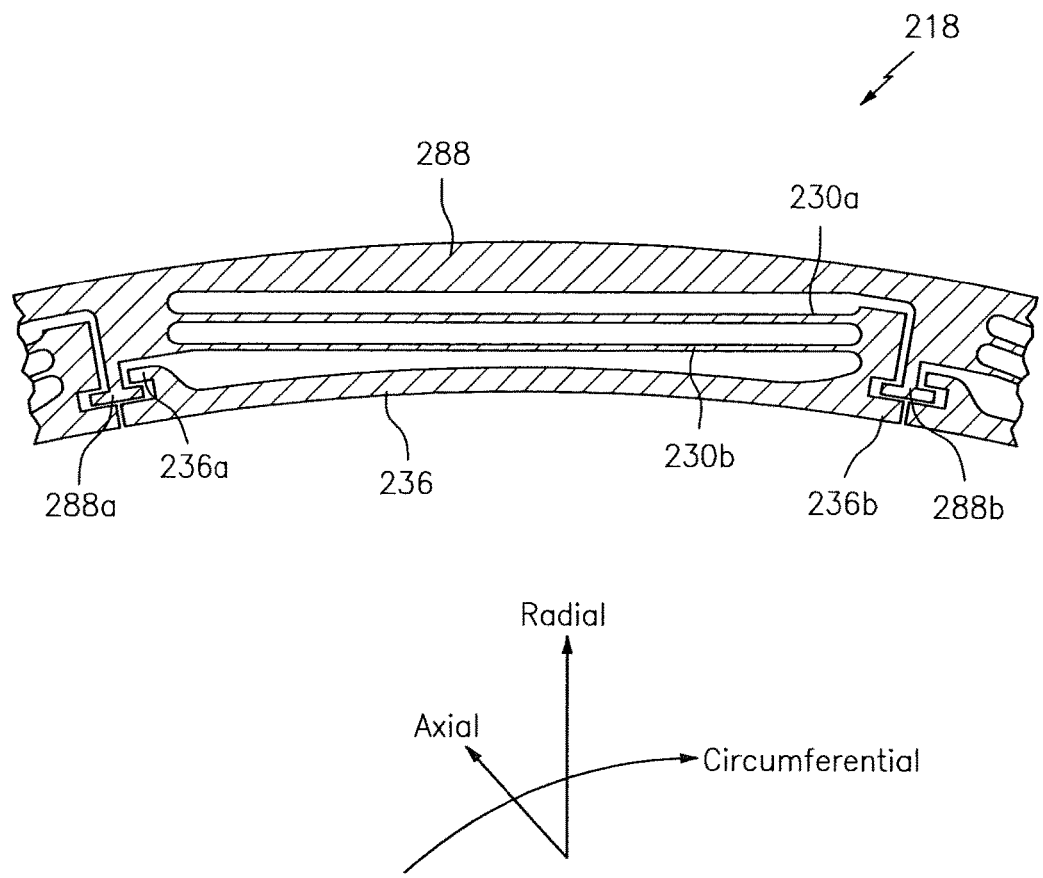
FIG. 2B illustrates a prior art seal of the system of FIG. 2A.
Figure 2C:
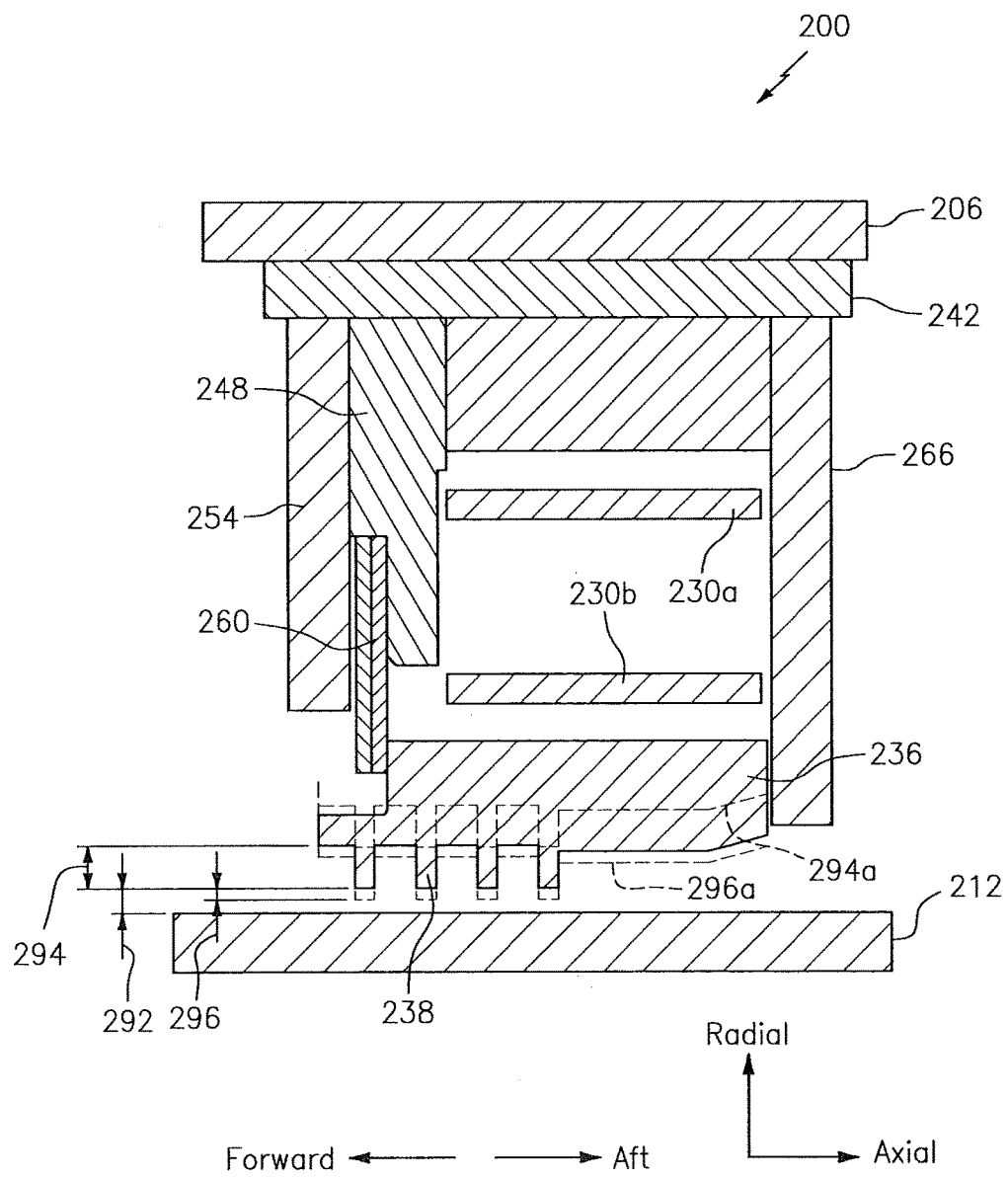
FIG. 2C illustrates the prior art sealing system of FIG. 2A with additional details associated with a range of deflection associated with a shoe of the seal of FIG. 2B.
Figure 3:
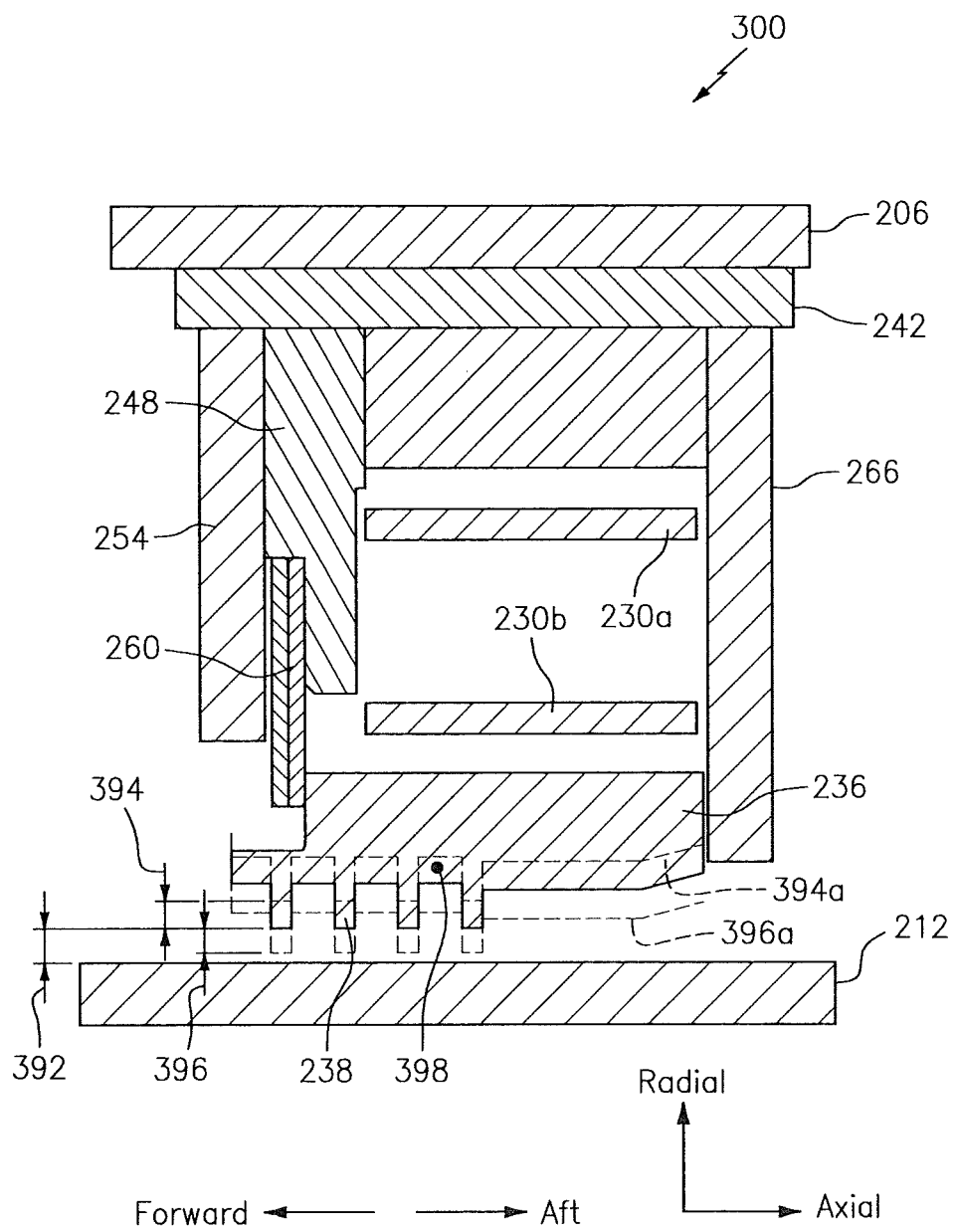
FIG. 3 illustrates a sealing system in accordance with aspects of this disclosure.

Referring now to FIG. 3, a sealing system 300 is shown. The system 300 incorporates many of the same components as described above in connection with FIGS. 2A-2C, and as such, a complete re-description is omitted herein for the sake of brevity.

In terms of differences, the system 300 is shown as incorporating a cold build gap 392. The cold build gap 392 may be defined between the radial inner end of the shoe 236 (e.g., the teeth 238) and a radial outer end/surface of the structure 212. Much like the cold build gap 292, the cold build gap 392 may be used to account for build/component tolerances and may help to avoid contact between the shoe 236/teeth 238 and the structure 212 during assembly.

The reference character 394 reflects the potential distance that the shoe 236 may move/deflect radially outward during engine operation relative to the cold/non-operational state of the engine. Similarly, the reference character 396 reflects the potential distance that the shoe 236 may move/deflect radially inward during engine operation relative to the cold/non-operational state of the engine. The range of potential positions of the shoe 236, in conjunction with reference characters 394 and 396, is reflected as existing between the phantom/dashed lines 394a and 396a.

As shown in FIG. 3, the distance 394 may be approximately equal to the distance 396. This embodiment may be contrasted with the scenario depicted in FIG. 2C, wherein the distance 294 is substantially larger than the distance 296. To obtain the results shown in FIG. 3, the cold-build gap 392 may be adjusted relative to the cold-build gap 292. For example, the cold-build gap 392 in FIG. 3 may be larger than the cold-build gap 292 of FIG. 2C.

As shown in FIG. 3, the cold/non-operational position of the shoe 236/teeth 238 may reside at a radial location that is substantially in the center of the range coinciding with the potential maximum radial outward deflection 394a and the potential maximum radial inward deflection 396a. In contrast, the cold/non-operational position of the shoe 236/teeth 238 resides at a location that is offset by as much as 30% relative to the potential overall range of deflections of the shoe 236/teeth 238 between the positions 294a and 296a in FIG. 2C. In this respect, in FIG. 3 the cold/non-operational position of the shoe 236/teeth 238 may be located within at least 30% of the center of the range between the positions 394a and 396a, and potentially within 10% of the center of the range between the positions 394a and 396a. Such values may be expressed in terms of the offset of the shoe 236/teeth 238 relative to the center position, where the offset may be related to the range of deflections between the positions 394a and 396a.

As described above, a reference point of the shoe 236 may be identified for purposes of describing the deflection/movement of the shoe 236 within the range identified by the lines 394a and 396a. For example, FIG. 3 illustrates a reference point 398 of the shoe 236. Different locations for a reference point may be selected/used.

The exact range of potential deflections between the positions 394a and 396a may be determined based on one or more of analysis, simulation, testing, etc. For example, a gapping analysis may be performed based on finite element analysis models to estimate the behavior of a seal and the seal's neighboring components. Some benchmarking of prior seals and their respective behavior and tolerances may also be considered.

Once the range is determined, the cold-build gap 392 may be selected so that the position of the shoe 236/teeth 238 during a non-operational state of the engine bisects the range. The cold-build gap 392 may be sized to accommodate worst case tolerances of the mating parts/components, taking into consideration any physical tools that may be used and the associated tooling tolerances.

Technical effects and benefits of this disclosure include a seal and associated sealing system environment that provides for enhanced seal lifetimes. By locating a shoe/teeth of the seal at a (substantial) center point associated with a range of deflections accommodated by the seal, the mean stress value imposed on beams of the seal may become (substantially) equal to zero.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. An engine comprising:
   a first structure;
   a second structure configured to rotate relative to the first structure;
   a floating, non-contact seal that interfaces the first structure and the second structure, wherein the seal includes:
   a shoe;
   a first beam coupled to the shoe; and
   a second beam coupled to the shoe; and
   a gap between the shoe and the second structure, the gap having a radial width during a non-operational state of the engine,
   wherein the radial width of the gap defines a position of the shoe with respect to the second structure wherein a reference point of the shoe, during the non-operational state of the engine, is substantially centered within a range of the radial deflections of the reference point of the shoe over the operating range of the engine.

2. The engine of claim 1, wherein the first structure is an engine case.

3. The engine of claim 1, wherein the second structure includes at least one of a shaft or a rotor disk.

4. The engine of claim 1, wherein the first and second structures are part of a compressor section of the engine.

5. The engine of claim 1, wherein the first and second structures are part of a turbine section of the engine.

6. The engine of claim 1, wherein the seal interfaces a first region of the engine to a second region of the engine in terms of an airflow from the first region of the engine to the second region of the engine.

7. The engine of claim 6, wherein the shoe comprises a plurality of teeth, and wherein the airflow substantially flows in an axial direction relative to a centerline of the engine, radially between the teeth and the second structure.

8. The engine of claim 7, wherein the teeth are located radially outward of the second structure with respect to an axial centerline of the engine.

9. The engine of claim 1, wherein the gap is defined between teeth of the shoe and the second structure during the non-operational state of the engine.

10. The engine of claim 1, wherein the radial width of the gap is larger than a maximum distance of radial deflections of the shoe from a center of the range of radial deflections of the shoe over the operating range of the engine.

* * * * *